United States Patent
Laffosse et al.

(10) Patent No.: US 9,576,097 B1
(45) Date of Patent: Feb. 21, 2017

(54) METHODS FOR CIRCUIT PATTERN LAYOUT DECOMPOSITION

(71) Applicant: GLOBALFOUNDRIES Inc., Grand Cayman (KY)

(72) Inventors: Elise Laffosse, Santa Clara, CA (US); Deniz Elizabeth Civay, Clifton Park, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/930,949

(22) Filed: Nov. 3, 2015

(51) Int. Cl.
*H01L 21/311* (2006.01)
*G06F 17/50* (2006.01)
*H01L 21/768* (2006.01)

(52) U.S. Cl.
CPC ..... *G06F 17/5072* (2013.01); *H01L 21/31144* (2013.01); *H01L 21/76816* (2013.01)

(58) Field of Classification Search
None
See application file for complete search history.

(56) References Cited

U.S. PATENT DOCUMENTS

| 2007/0172770 | A1* | 7/2007 | Witters | H01L 21/0337 430/313 |
| 2010/0311242 | A1* | 12/2010 | Deng | G03B 27/42 438/689 |
| 2014/0065302 | A1* | 3/2014 | Chang | H01L 51/0011 427/162 |
| 2016/0300754 | A1* | 10/2016 | Civay | H01L 21/7688 |

OTHER PUBLICATIONS

U.S. Appl. No. 14/684,949, entitled "Methods for Fabricating Integrated Circuits Using Multi-Patterning Processes", filed Apr. 13, 2015, not yet published and presently held confidential by the U.S. Patent and Trademark Office.

* cited by examiner

*Primary Examiner* — Shamim Ahmed
(74) *Attorney, Agent, or Firm* — Heslin Rothenberg Farley and Mesiti PC; Nicholas Mesiti

(57) ABSTRACT

Methods and computer program products for decomposing and etching a circuit pattern layout are provided. The methods may include decomposing a circuit pattern layout into a first sub-pattern and second sub-pattern, where the decomposing includes: identifying, from the circuit pattern layout, a design line and a design via location associated with the design line; forming a first pattern line for the first sub-pattern corresponding to a first portion of the design line, and a second pattern line for the second sub-pattern corresponding to a second portion of the design line, with the first and second pattern lines overlapping at the design via location in an overlay of the first sub-pattern with the second sub-pattern. The first sub-pattern may be etched in a first circuit structure layer and the second sub-pattern etched in a second circuit structure layer, the etching at least partially forming a via at the design via location.

12 Claims, 13 Drawing Sheets

METHODS FOR CIRCUIT PATTERN LAYOUT DECOMPOSITION

FIELD OF THE INVENTION

The present invention generally relates to circuit pattern layout decomposition, and more specifically to methods of decomposing a circuit pattern layout into multiple sub-patterns to be etched into circuit structure layers of an integrated circuit device.

BACKGROUND

In fabricating integrated circuits (ICs) or semiconductor devices, the density of components continues to increase to achieve greater functionality and reduced manufacturing costs. Advanced patterning and etching techniques that allow existing tools to fabricate such smaller and more densely packed circuit structure components have been developed, such as double patterning or multiple patterning techniques. Double and multiple patterning techniques generally involve decomposing a circuit pattern layout into two or more sub-patterns that a fabrication tool can accurately form on a circuit structure layer, and may also include patterning connecting vias that connect a circuit structure layer to lower layers of the circuit structure, such as connecting one metallization layer to a lower metallization layer. Double and multiple patterning techniques generally require numerous steps of material layer deposition, masking, patterning, etching, and layer removal, so that each sub-pattern to be formed in a double/multiple patterning process represents significant costs in materials and fabrication time. Improved double and multiple patterning techniques that can reduce such costs and fabrication time thus continue to be developed.

SUMMARY OF THE INVENTION

Various shortcomings of the prior art are overcome, and additional advantages are provided through the provision, in one aspect, of a method including: decomposing a circuit pattern layout for a layer of a circuit structure into at least a first sub-pattern and a second sub-pattern, the decomposing including: identifying, from the circuit pattern layout, at least one design line and at least one design via location associated with the at least one design line; forming a first pattern line for the first sub-pattern, the first pattern line corresponding to a first portion of the at least one design line, and a second pattern line for the second sub-pattern, the second pattern line corresponding to a second portion of the at least one design line, wherein the first pattern line and the second pattern line overlap at least at the at least one design via location in an overlay of the first sub-pattern with the second sub-pattern; and, etching the first sub-pattern in a first circuit structure layer and the second sub-pattern in a second circuit structure layer, the etching at least partially forming a via at the at least one design via location.

In another aspect, also provided is a computer program product that includes a storage medium readable by a processor and storing instructions for execution by the processor for performing a method, the method including: decomposing a circuit pattern layout for a layer of a circuit structure into at least a first sub-pattern and a second sub-pattern, the decomposing including: identifying, from the circuit pattern layout, at least one design line and at least one design via location associated with the at least one design line; and, forming a first pattern line for the first sub-pattern, the first pattern line corresponding to a first portion of the at least one design line, and a second pattern line for the second sub-pattern, the second pattern line corresponding to a second portion of the at least one design line, wherein the first pattern line and the second pattern line overlap at least at the at least one design via location in an overlay of the first sub-pattern with the second sub-pattern.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Reference is made below to the drawings, which are not drawn to scale for ease of understanding, wherein the same reference numbers used throughout different figures designate the same or similar components.

Multi-patterning or multiple patterning (MP) processes have become increasingly important in the fabrication of integrated circuits. As circuit structure features have continued to shrink and become increasingly complex, circuit structure fabrication techniques have been continually modified, such as by multiple patterning processes, to successfully form transistor features, metallization lines, and other integrated circuit components. Multiple patterning processes generally require "decomposing" a single circuit pattern layout of design lines and connecting vias into several sub-patterns, where each sub-pattern contains a sub-set of the design lines or contains the designed connecting vias separated from the lines. The decomposition process generally takes into account the resolution capabilities of fabrication tools so that the lines or vias included in any one sub-pattern can be fabricated with minimal defects. Each sub-pattern may then be successively formed in one or more etch masks through a series of patterning and etching processes, and each patterning and etching process may include numerous stages of material deposition, patterning, material removal, etching, and so on. Each patterning and etching process thus incurs costs in fabrication time and materials and processing costs, so that eliminating even a single pattern and etch stage may significantly increase productivity and reduce costs.

Figure 1A:
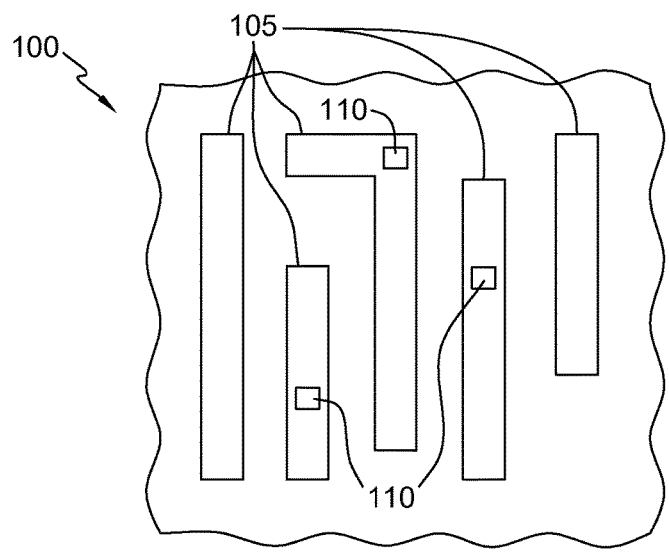
FIGS. 1A-1E depict an example of processes for decomposing a circuit design layout into multiple sub-patterns, illustrating issues and drawbacks with such processes.

FIG. 1A depicts one example of a circuit pattern layout 100. Circuit pattern layout 100 includes design lines 105 and design via locations 110 to be formed. Design lines 105 may, for example, correspond to metal lines to be formed in a metal layer of a circuit structure, while design via locations 110 may correspond to metal via connections to be formed that will electrically connect the metal layer to another metal layer below or to other circuit structure layers. Depending on the physical spacing between design lines 105 and the limitations of available fabrication tools, it may not be possible to form circuit pattern layout 100 on a wafer by one or even two masks, and may require a multiple patterning process to be successfully transferred to a wafer.

Figure 1B:
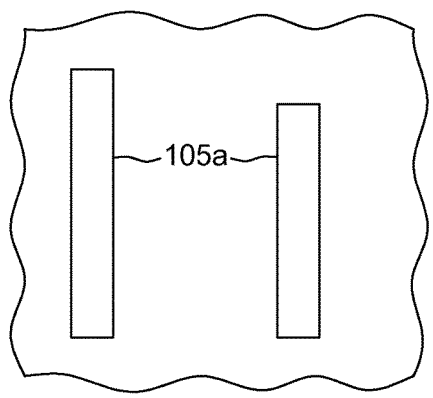
Figure 1C:
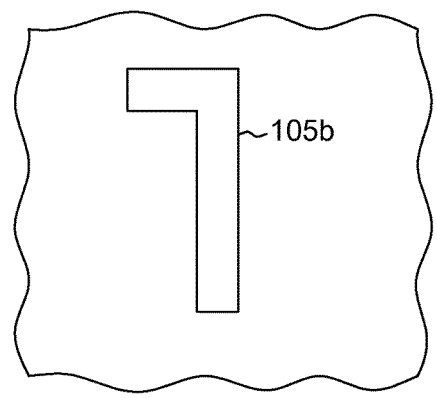
Figure 1D:
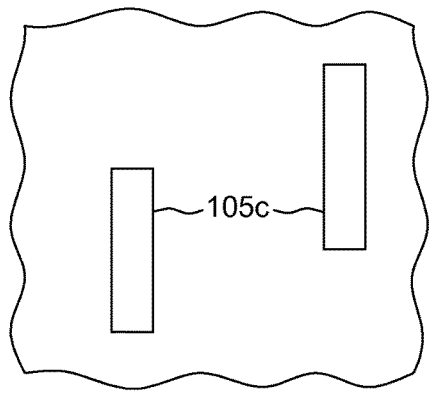
Figure 1E:
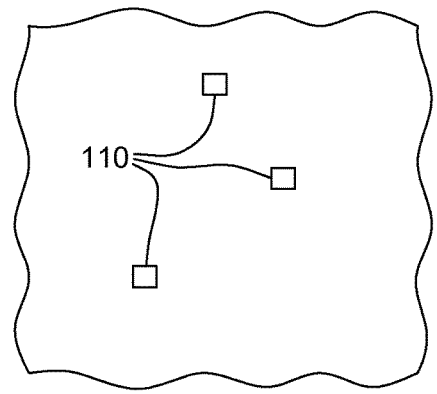

FIGS. 1B-1E depict one example of a series of sub-patterns that may be formed, using available decomposition methods, to pattern circuit pattern layout 100 on a wafer by multiple patterning. Design lines 105 of circuit pattern layout 100 may be decomposed into, for example, three sub-patterns as depicted in FIGS. 1B-1D, where one sub-pattern contains design lines 105*a*, a second sub-pattern contains design line 105*b*, and a third sub-pattern contains design lines 105*c*. A fourth sub-pattern, depicted in FIG. 1E, may contain the design via locations 110. Each of the four sub-patterns may then be successively patterned and etched on a wafer. Each sub-pattern, as discussed above, may require a series of steps of material deposition, patterning, removal of excess material, additional material deposition and patterning, etching, and so on. Thus, every sub-pattern needed to fabricate one layer of a circuit structure increases materials used, time for tools to fabricate each sub-pattern, and the potential for errors in fabrication and alignment between formed sub-patterns. The ability to reduce the number of sub-patterns needed to form a circuit structure layer may significantly reduce such costs and errors in fabrication.

Thus, generally stated, provided herein is a method including: decomposing a circuit pattern layout for a layer of a circuit structure into at least a first sub-pattern and a second sub-pattern, the decomposing including: identifying, from the circuit pattern layout, at least one design line and at least one design via location associated with the at least one design line; forming a first pattern line for the first sub-pattern, the first pattern line corresponding to a first portion of the at least one design line, and a second pattern line for the second sub-pattern, the second pattern line corresponding to a second portion of the at least one design line, wherein the first pattern line and the second pattern line overlap at least at the at least one design via location in an overlay of the first sub-pattern with the second sub-pattern; and, etching the first sub-pattern in a first circuit structure layer and the second sub-pattern in a second circuit structure layer, the etching at least partially forming a via at the at least one design via location.

Also provided herein is a computer program product that includes a storage medium readable by a processor and storing instructions for execution by the processor for performing a method, the method including: decomposing a circuit pattern layout for a layer of a circuit structure into at least a first sub-pattern and a second sub-pattern, the decomposing including: identifying, from the circuit pattern layout, at least one design line and at least one design via location associated with the at least one design line; and, forming a first pattern line for the first sub-pattern, the first pattern line corresponding to a first portion of the at least one design line, and a second pattern line for the second sub-pattern, the second pattern line corresponding to a second portion of the at least one design line, wherein the first pattern line and the second pattern line overlap at least at the at least one design via location in an overlay of the first sub-pattern with the second sub-pattern.

Figure 2:
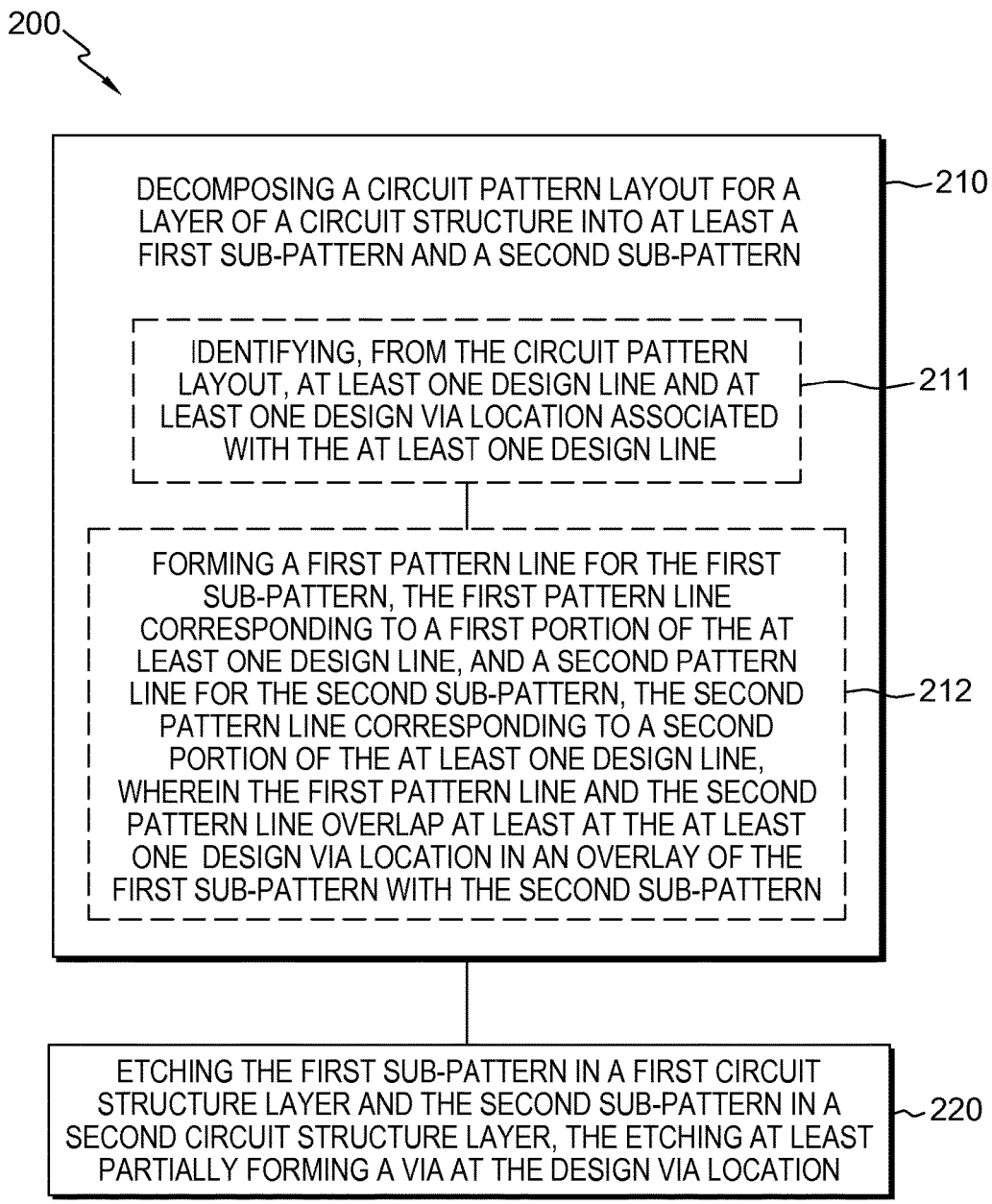
FIG. 2 is a block diagram depicting one embodiment of a process for decomposing a circuit pattern layout into first and second sub-patterns and etching the first and second sub-patterns in circuit structure layers, in accordance with one or more aspects of the present invention.

FIG. 2 depicts, by way of block diagram, an exemplary process 200 in which a circuit pattern layout is decomposed into at least a first sub-pattern and second sub-pattern, and the first and second sub-patterns are etched and form a via at a design via location. At block 210, a circuit pattern layout for a layer of a circuit structure is decomposed into at least a first sub-pattern and a second sub-pattern. The decomposing includes, at block 211, identifying, from the circuit pattern layout, at least one design line and at least one design via location associated with the at least one design line. The decomposing further includes, at block 212, forming a first pattern line for the first sub-pattern and a second pattern line for the second sub-pattern. The first pattern line corresponds to a first portion of the at least one design line, and the second pattern line corresponds to a second portion of the at least one design line, and the first pattern line and the second pattern line overlap at least at the at least one design via location in an overlay of the first sub-pattern with the second sub-pattern. The process further includes, at block 220, etching the first sub-pattern in a first circuit structure layer and the second sub-pattern in a second circuit structure layer, the etching at least partially forming a via at the at least one design via location. As described further below, the etching may form the at least one via through the first and second circuit structure layers without using a via masking pattern, as well as without using masking materials or separate etching processes to form the at least one via.

FIGS. 3A-3F depict one example of a circuit pattern layout 300 for a layer of a circuit structure and an exemplary embodiment of decomposing the circuit pattern layout 300 into a first sub-pattern and a second sub-pattern. The exemplary circuit pattern layout 300 depicted by FIG. 3A includes, for example, design lines 310, 320, 330, 340, and 350 and design via locations 315, 325, 335, 345, and 355 associated with respective design lines 310, 320, 330, 340, 350. The process of decomposing circuit pattern layout 300 may include, prior to decomposing the layout, identifying design lines 310-350 and design via locations 315-355 associated with design lines 310-350. Circuit pattern layout 300 may, in some example embodiments, include some design lines that do not have design via locations associated with those design lines (not depicted in FIGS. 3A-3F). Such design lines may be included in either the first sub-pattern or second sub-pattern, or even a third sub-pattern, generated by decomposition of circuit pattern layout 300, but generally may not need to be decomposed into a first portion and second portion, as described further below. For simplicity, FIGS. 3A-3F do not depict design lines that may be present in a circuit pattern layout 300 that do not need to be decomposed into multiple portions. The exemplary circuit pattern layout design lines 310 through 350 are presented, by way of example only, of several types of design lines that may be used in a circuit pattern layout; those with skill in the art will recognize that many variations of the examples presented, as well as other types of design lines, may also be present in a circuit pattern layout.

The process for decomposing circuit pattern layout 300 may also include measuring a width of at least one design line 310-350, and using the width to classify the at least one design line as either a narrow design line or a wide design line. As described further below, the classification of a design line as "narrow" versus "wide" may, in various embodiments, partially determine how the design line is decomposed into at least a first sub-pattern and a second sub-pattern. Design line 330, for example, may have a width measured that classifies design line 330 as a "narrow" design line. Similarly, design lines 310, 320, and 340 may also have a width that classifies design lines 310, 320, and 340 as narrow design lines. By contrast, design line 350 may have a width measured that classifies design line 350 as a "wide" design line. The difference between "narrow" design lines and "wide" design lines may depend, for example, on a critical dimension or minimum feature size for the circuit pattern layout. Narrow design lines, for example, may have a width that equals or approximately equals a minimum feature size or critical dimension for the circuit pattern layout. Wide design lines may have a width significantly larger than the minimum feature size or critical dimension for the circuit pattern layout, such as two times or three times the minimum feature size or even larger, as exemplified in FIG. 3A by design line 350.

Figure 3A:
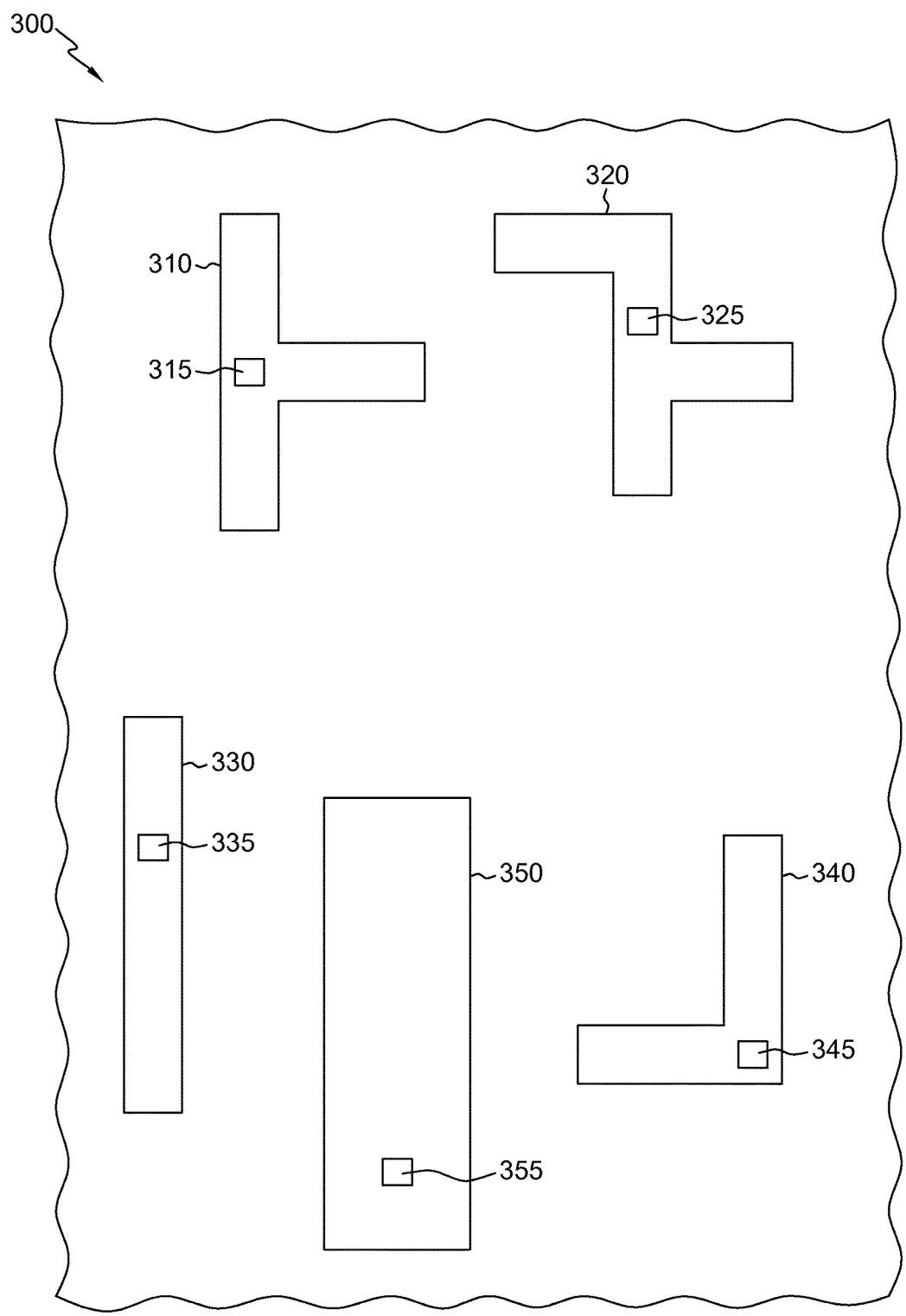
FIGS. 3A-3F depict one example embodiment of decomposing a circuit pattern layout into first and second sub-patterns, in accordance with one or more aspects of the present invention.
Figure 3B:
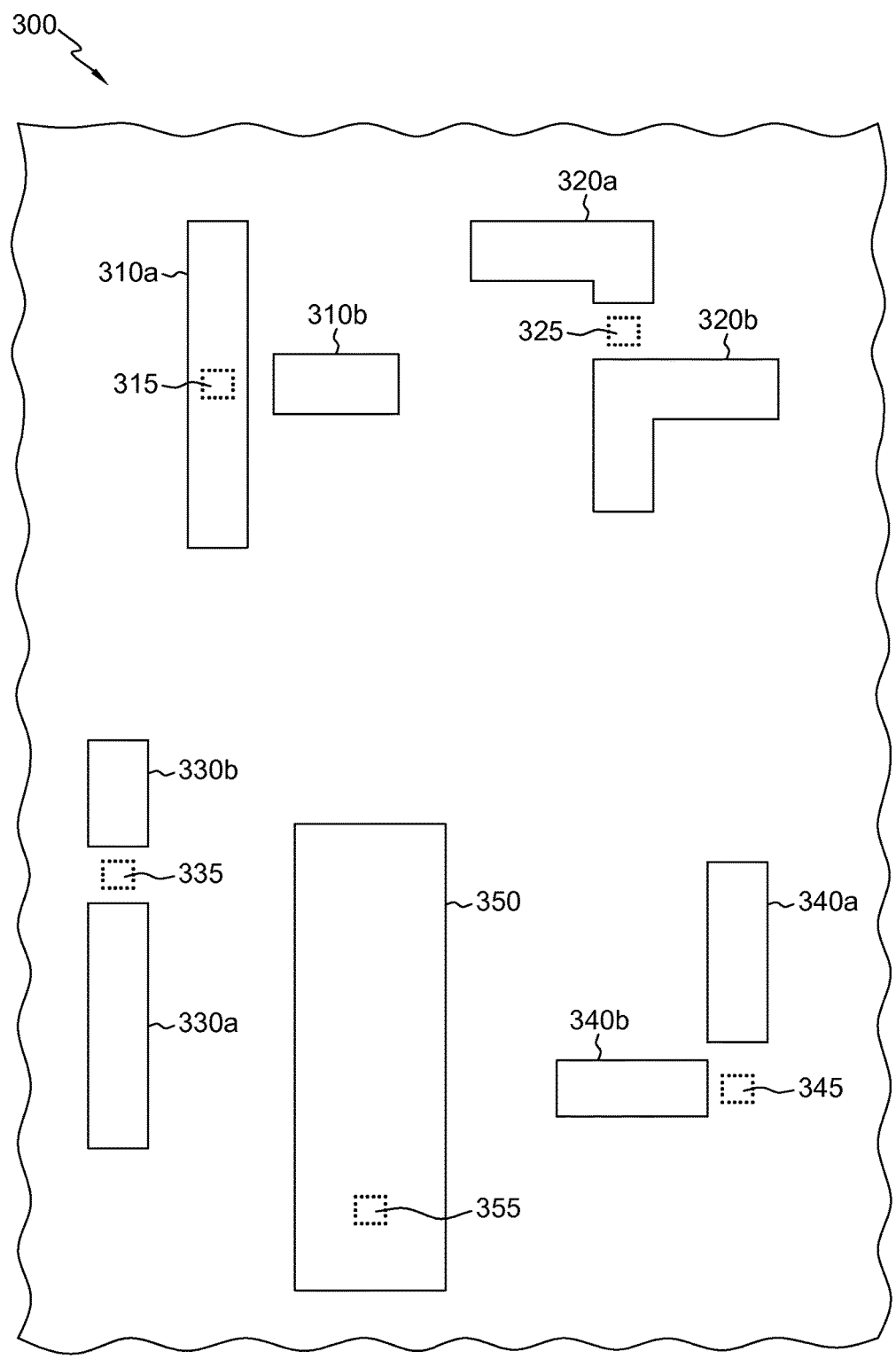

FIG. 3B depicts circuit pattern layout 300 during a stage of decomposition into a first sub-pattern and second sub-pattern. For a design line classified as a narrow design line, such as design lines 310-340, the decomposition may include dividing, at the design via location associated with the design line, the design line into a first pattern line and a second pattern line. The first pattern line and second pattern line, as described further below, may be a first pattern line of the first sub-pattern and a second pattern line of the second sub-pattern. In some instances, dividing a design line at the associated design via location may result in a first pattern line, such as first pattern line 310a, that overlaps the associated design via location 315, and a second pattern line, such as second pattern line 310b, that does not overlap the associated design via location 315. In other instances, dividing a design line at the associated design via location may result in a first pattern line and second pattern line, such as first pattern line 320a and second pattern line 320b, that do not overlap the associated design via location 325. As the examples of FIG. 3B illustrate, the shapes and lengths of resulting first pattern line 310a-340a and second pattern line 310b-340b may depend, in part, on where the associated design via location 315-345 is located relative to the original design line 310-340, as well as the original shape of design line 310-340.

As FIG. 3B illustrates, a design line classified as a wide design line, such as design line 350, may not undergo division into a first pattern line and second pattern line. Decomposition of wide design lines 350 may be handled differently from narrow design lines 310-340, as further detailed below.

Figure 3C:
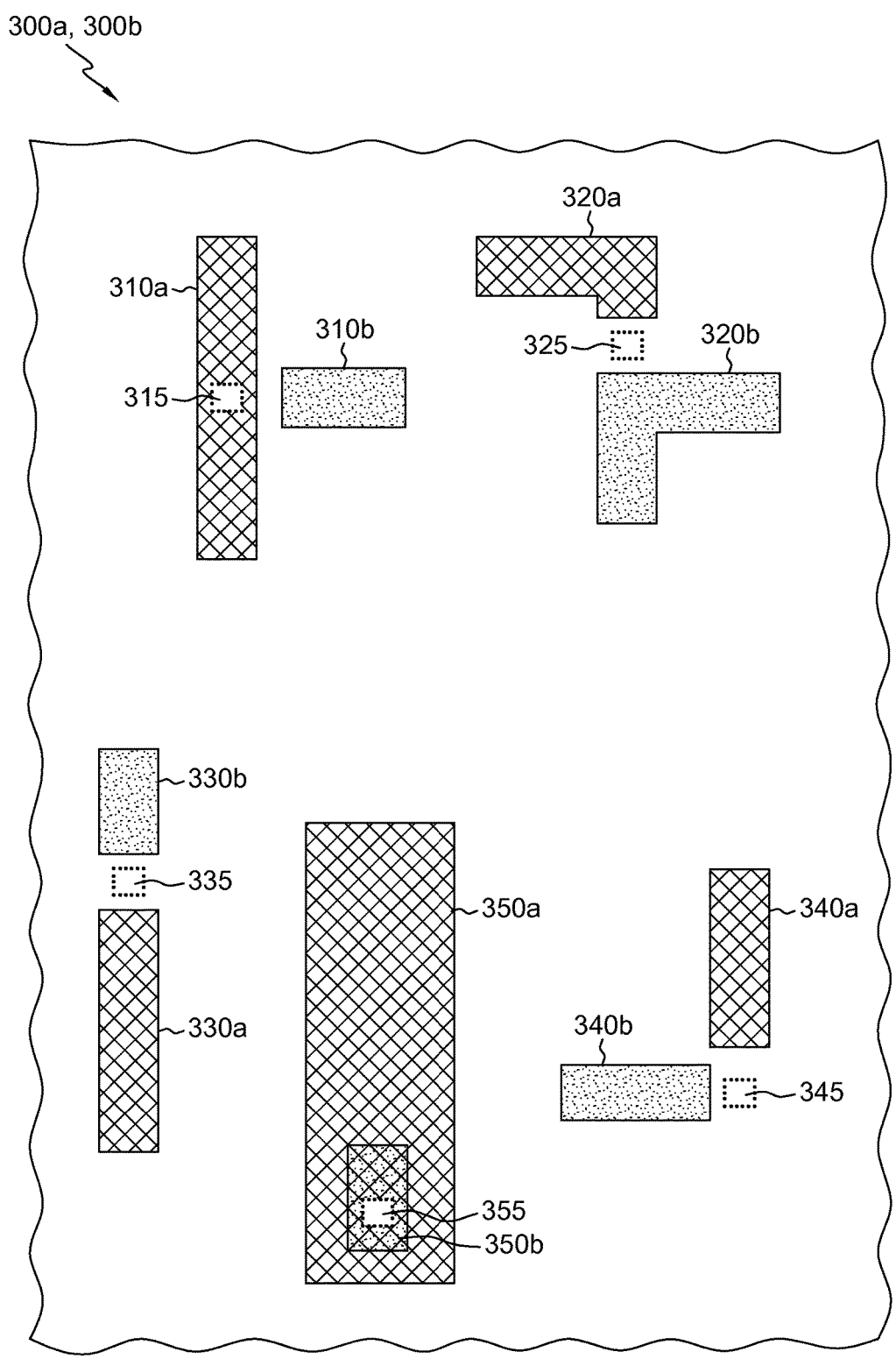

FIG. 3C depicts circuit pattern layout 300 during another stage of decomposition into a first sub-pattern and second sub-pattern. First pattern lines 310a-340a may be identified or coded to be included in a first sub-pattern, and second pattern lines 310b-340b may be identified or coded to be included in a second sub-pattern. In exemplary embodiments, identifying or coding a first pattern line 310a-340a and second pattern line 310b-340b for inclusion in a first sub-pattern or second sub-pattern may be referred to as "coloring" of the first pattern lines and second pattern lines. One or more factors may be taken into account in determining whether a pattern line should be coded as a first pattern line 310a-340a for a first sub-pattern or a second pattern line 310b0b. For example, a distance separating any two pattern lines, such as a distance between first pattern line 310a and first pattern line 330a, may be one factor, as generally it may be desirable for pattern lines included in a sub-pattern to be separated by at least a distance equal to (or greater than), for example, a critical dimension of the circuit pattern layout 300. A shape of a pattern line, such as first pattern line 320a or second pattern line 320b, may also be a factor used in identifying or coding pattern lines. As further described herein, in embodiments in which a circuit pattern layout is decomposed in to a first sub-pattern and a second sub-pattern and a third sub-pattern, the identifying or coding of pattern lines may include identifying or coding pattern lines for inclusion on one of the three sub-patterns.

FIG. 3C also illustrates a part of the decomposition process for wide design line 350 from FIG. 3B. Decomposition of a wide design line 350 may include forming the first pattern line 350b for the first sub-pattern, where the first pattern line is disposed or arranged to overlap the design via location 355 associated with the original wide design line 350. The decomposition may also include forming the second pattern line 350a for the second sub-pattern, where the second line matches the design line 350 and overlaps first pattern line 350b at least at the design via location 355 associated with the original design line 350. The first pattern line 350b and second pattern line 350a may instead be second pattern line 350b and first pattern line 350a, depending on which of the first or second sub-pattern the wider pattern line 350a best fits relative to other pattern lines.

Figure 3D:
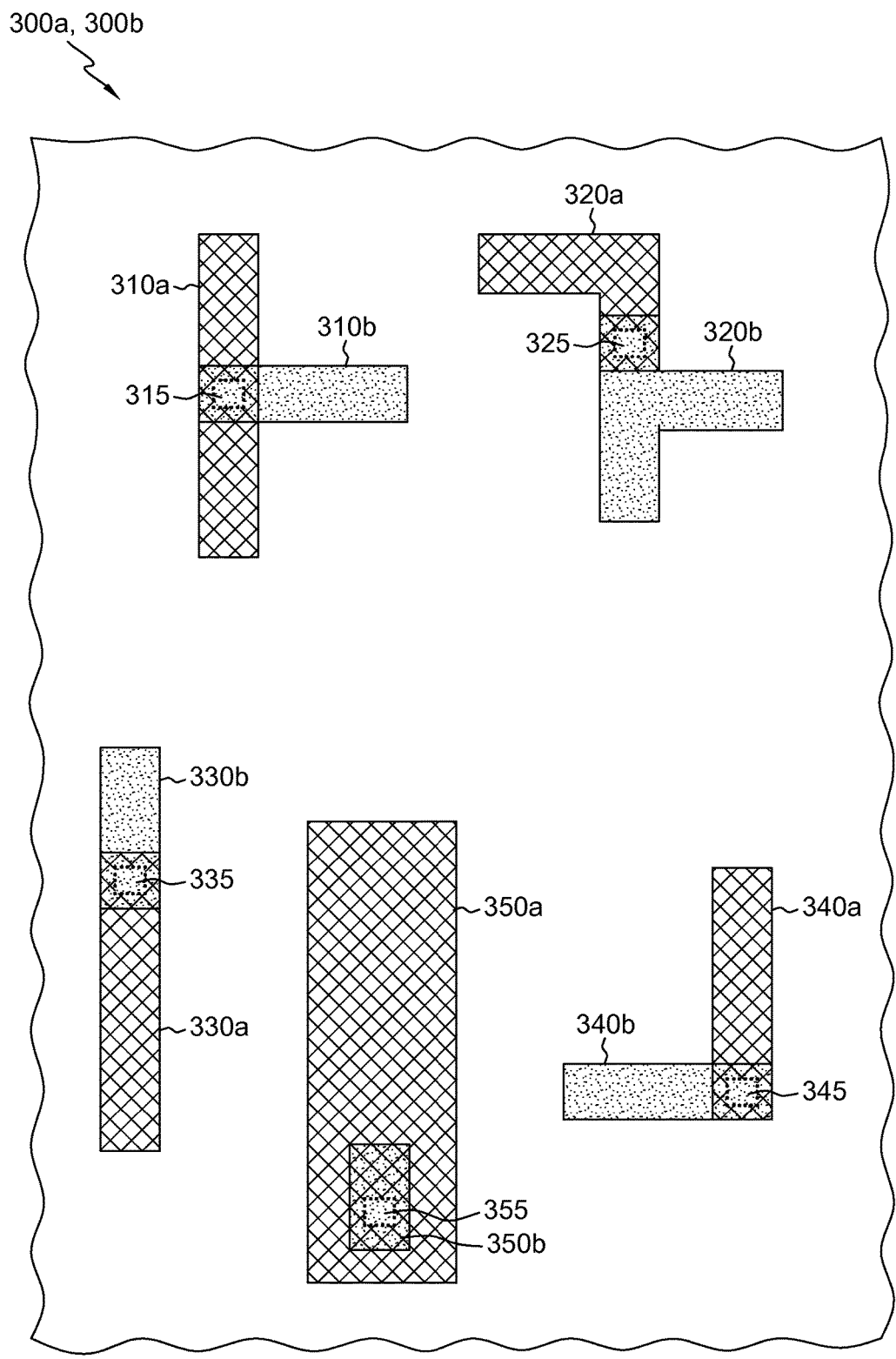

FIG. 3D depicts circuit pattern layout 300 following extension of a portion of at least a first pattern line or lines so that the first pattern line and second pattern line overlap at the associated at least one design via location, in an overlay of the first sub-pattern with the second sub-pattern. For example, as illustrated by first and second pattern lines 310a and 310b, pattern line 310b may be extended so that pattern line 310b overlaps design via location 315 and with pattern line 310a. Pattern line 310a may not require any portion to be extended as pattern line 310a may already overlap the associated design via location, as shown in FIG. 3C. The process may further include extending a portion of the second pattern line, as well as extending the first pattern line, so that the first pattern line and the second pattern line overlap at the at least one design via location, in the overlay of the first sub-pattern with the second sub-pattern. For example, as illustrated by first and second pattern lines 320a and 320b, portions of both first 320a and second 320b pattern lines may be extended to that first and second pattern line 320a and 320b overlap, in an overlay, at design via location 325. First and second pattern lines 330 and 330b, as well as first and second pattern lines 340a and 340b, are also illustrative. By extending at least the first pattern line, or by extending the first pattern line and second pattern line, to overlap the first and second pattern lines at the associated design via location, it may be possible to eliminate a separate via pattern and thus eliminate a separate via patterning/etching step in fabricating an integrated circuit layer. As discussed further below, because the first pattern line and second pattern line overlap at the design via location, the overlap region may effectively be etched multiple times as design lines are etched, resulting at least partially in an etched via as at the design via location.

Accordingly, in some embodiments it may advantageous to further extend either or both the first pattern line and second pattern line to increase a size of the resulting etched via following etching of the first sub-pattern and second sub-pattern. A circuit structure may include, for instance, a connecting layer disposed below the layer corresponding to the circuit pattern layout, such as circuit pattern layout 300, with the connecting layer having at least one connecting line associated with an at least one design via location of the circuit pattern layout. The connecting layer may be, for example, a metallization layer, a transistor layer, or another circuit structure layer. Vias may generally be formed between circuit layers and subsequently filled with a conductive material, such as copper or another conductive metal, to facilitate electrical connections between lines or connecting lines of circuit structure layers. It may thus be important to ensure that a conductive via sufficiently overlaps with a connecting line to ensure sufficient electrical connectivity. As the processes disclosed herein may advantageously etch vias as a result of etching design lines, and thus eliminate separate patterning and etching steps for vias, first pattern lines and/or second pattern lines may not only be extended to overlap at the design via location, but may be further extended to increase the overlap of the first pattern line and second pattern line, effectively increasing a size of the resulting etched via at the design via location. Either or both the first pattern line and second pattern line may be extended along a length corresponding to the at least one connecting line of the connecting layer. Extending a first or second pattern line along the length corresponding to the at least one connecting line may increase a size of the resulting etched via along the length of the connecting line, so that a conductive material filling the etched via may have a greater contact area with the connecting line. First and/or second pattern lines may not only be extended for narrow design lines, such as design lines 310-340, but also for wide design lines such as design line 350.

Figures 3E, 3F:
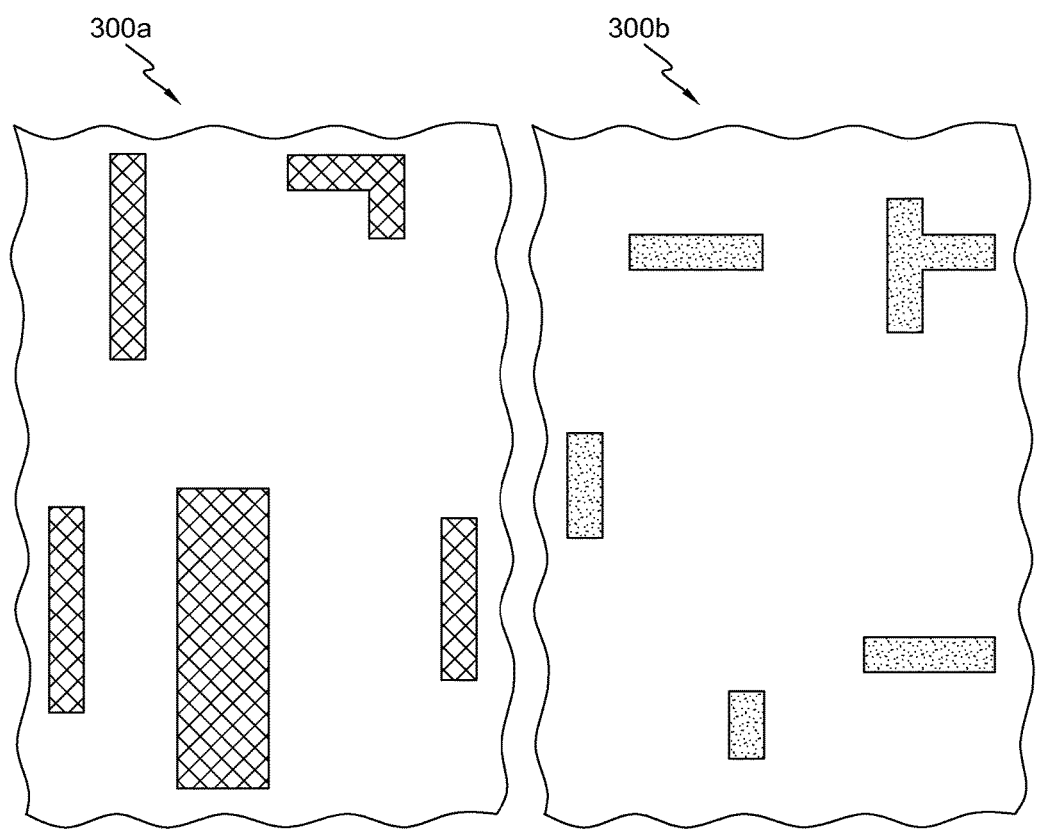

FIGS. 3E and 3F depict a first sub-pattern 300a and a second sub-pattern 300b, as formed according to the processes described above. First sub-pattern 300a in FIG. 3E and second sub-pattern 300b in FIG. 3F may be the first sub-pattern and second sub-pattern of FIG. 3D, as viewed when separated into separate sub-patterns. Thus, FIG. 3D may also depict first sub-pattern 300a and second sub-pattern 300b in an overlay of first sub-pattern 300a with second sub-pattern 300b.

FIGS. 4A-4G depict one exemplary embodiment of etching the first sub-pattern in a first circuit structure layer and the second sub-pattern in a second circuit structure layer, so that the etching at least partially forms a via at the at least one design via location. The first sub-pattern and second sub-pattern may be sub-patterns such as exemplary sub-patterns 300a and 300b of FIGS. 3E and 3F, or may be any first and second sub-patterns according to the processes described herein. For simplicity and ease of understanding, FIGS. 4A-4G depict a portion of first sub-pattern and second sub-pattern, such as first pattern line 330a and second pattern line 330b in FIGS. 3C-3D, but it may be understood that the exemplary etching depicted in FIGS. 4A-4G may apply to any first pattern line and second pattern line, as well as any first sub-pattern and second sub-pattern. As well, for simplicity and ease of understanding, FIGS. 4A-4G depict only one example embodiment of etching the first sub-pattern and second sub-pattern without additional patterning and/or processing steps that may be included. Thus, in alternative embodiments, additional insulating layers, masking layers, and other material layers not depicted in FIGS. 4A-4G may be provided, etched, and/or removed during processing. It may further be understood, as further discussed below, that the etching processes described herein may be extended to etching of a third sub-pattern into a circuit structure layer and to etching of additional sub-patterns as may be needed.

Figure 4A:
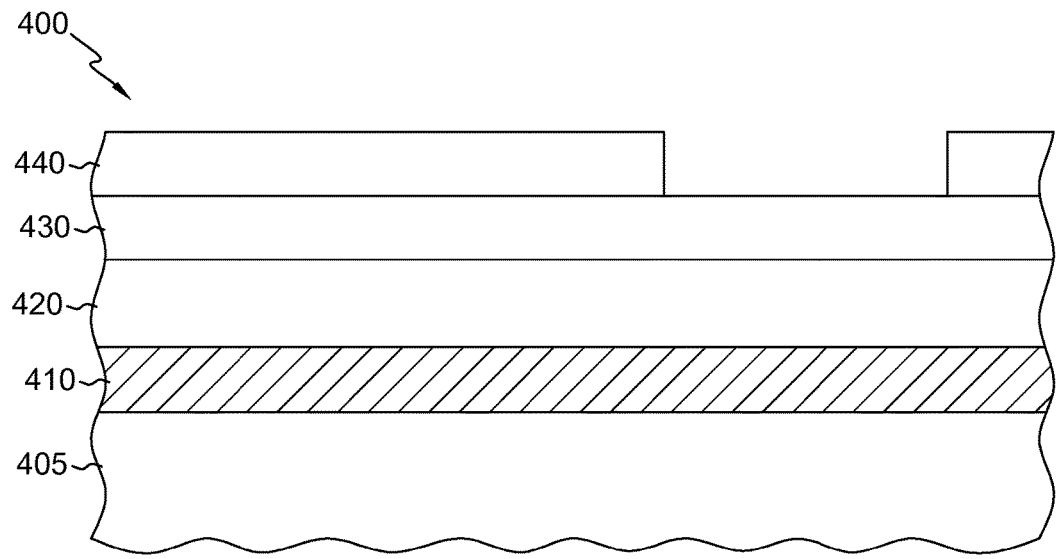
FIGS. 4A-4G depict a portion of a circuit structure undergoing etching of a portion of the first and second sub-patterns depicted in FIGS. 3A-3F, in accordance with one or more aspects of the present invention.

FIG. 4A depicts a structure 400 including a substrate 405 and a connecting layer 410 over the substrate. As used herein, the term "substrate" may not only refer to a semiconductor wafer, but may also refer to any layer of a circuit structure formed over a semiconductor wafer substrate. Substrate 405 may thus include, in one or more embodiments, metallization layers and/or transistor layers of structure 400. Similarly, connecting layer 410 may include any layer of a circuit structure requiring electrical connection to one or more other layers of the circuit structure. Connecting layer 410 may thus include a metallization layer, a transistor layer, or other layer of the circuit structure. Structure 400 also includes, for example, a first insulating layer 420, such as an isolation material or dielectric material, for instance silicon dioxide. First insulating layer 420 may also be a via layer 420 in which one or more conductive vias are to be formed. Second insulating layer 430 may include an isolation material or dielectric material, such as silicon dioxide, and may also be a layer in which a sub-pattern of a circuit pattern layout, such as circuit pattern layout 300, is to be formed. A patterned masking material layer 440 may be formed over structure 400 for patterning the first or second sub-pattern, as further described below.

Figure 4B:
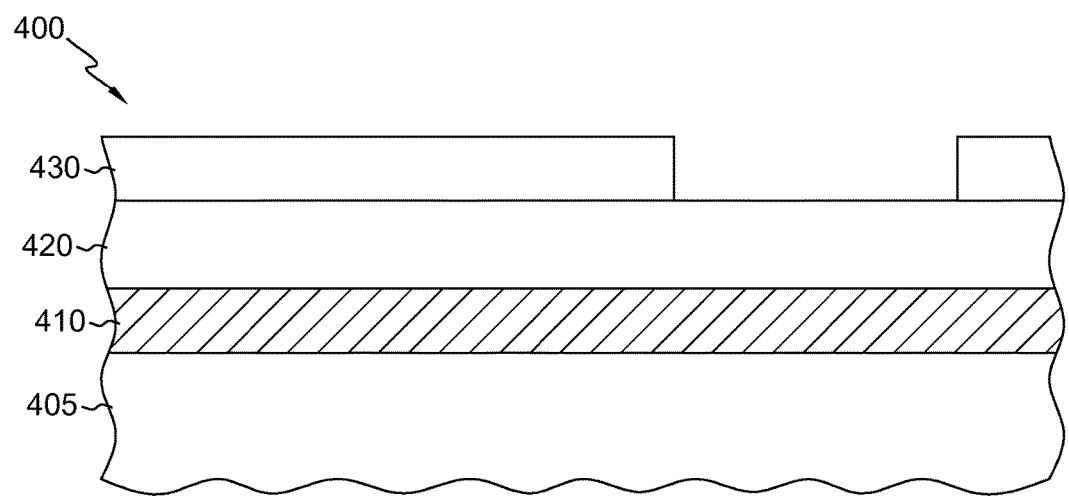

FIG. 4B depicts structure 400 following etching of a portion of, for example, a the second sub-pattern into second insulating layer 430. The etched portion of second insulating layer 430 may correspond, for example, to second pattern line 330b as depicted in FIGS. 3D and 3F. The etching process may be any process capable of controllably etching a portion of second insulating layer 430, such as a reactive ion etch process. As depicted in FIG. 4B, the patterned masking material layer 440 may be stripped following etching of insulating layer 430.

Figure 4C:
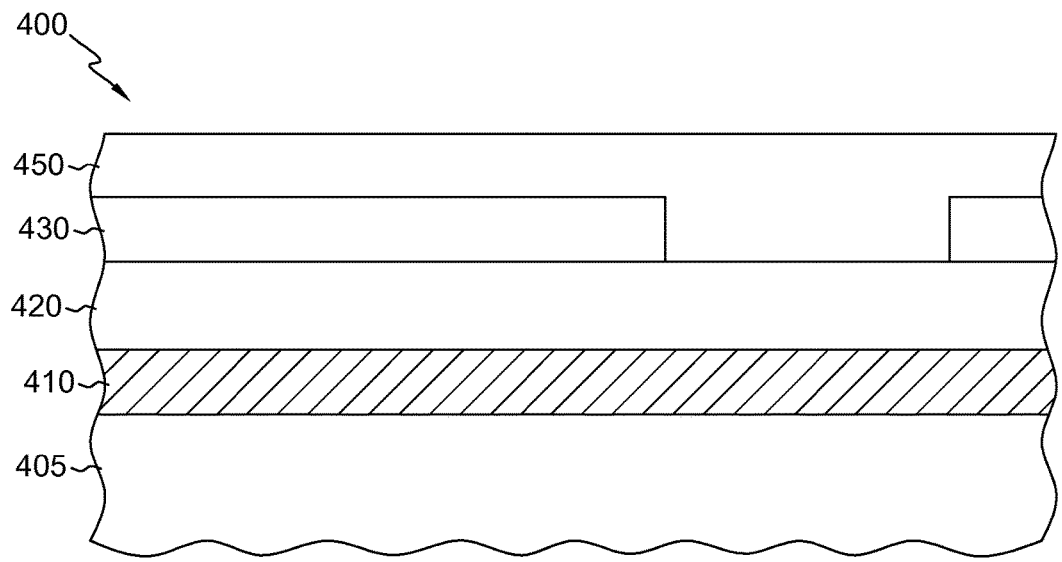
Figure 4D:
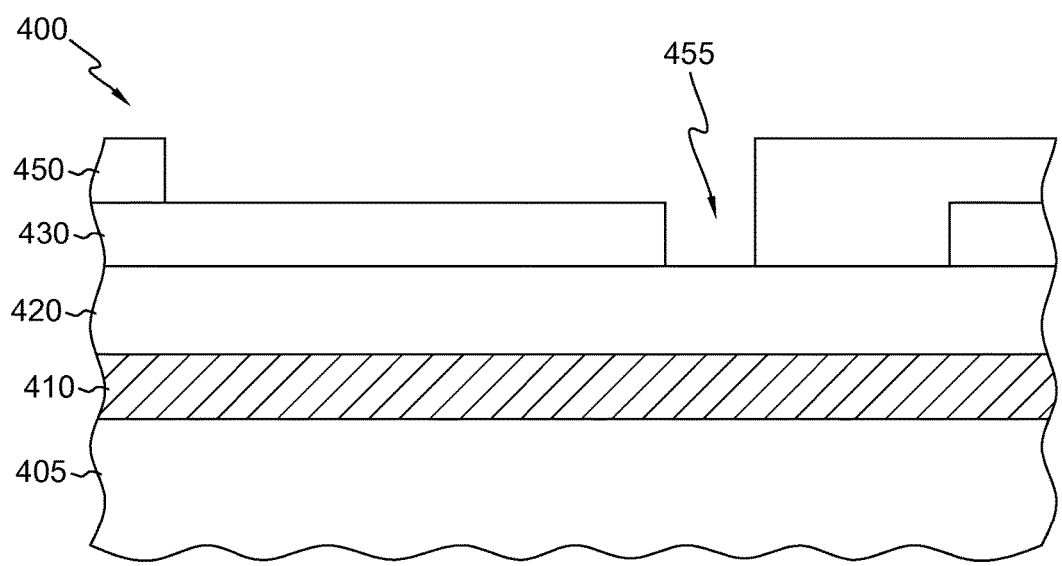

FIG. 4C depicts structure 400 following provision of another masking material layer 450 over structure 400. The another masking material 450 may be a similar material to masking material 440 or may be another masking material. FIG. 4D depicts structure 400 of FIG. 4C following patterning of the another masking material layer 450. As FIG. 4D depicts, the another masking material layer 450 may be patterned to expose a portion of second insulating layer 430 corresponding to first pattern line 330a as depicted in FIGS. 3D and 3E, and patterned to expose a part 455 of the previously etched portion of first insulating layer 420. The exposed part 455 of first insulating layer 420 may correspond to the at least one design via location 335 associated with design line 330, as depicted in FIGS. 3A-3D.

Figure 4E:
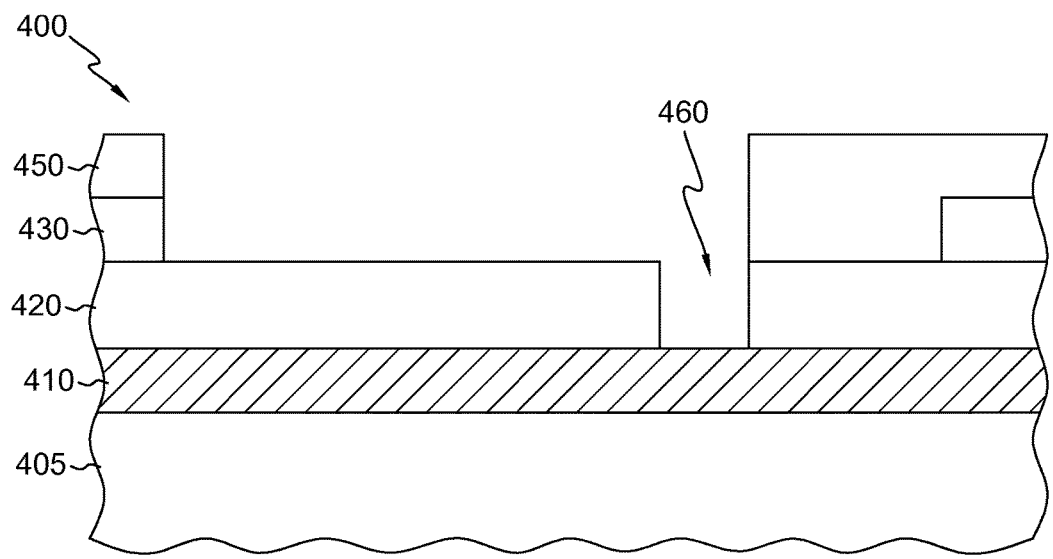

FIG. 4E depicts structure 400 of FIG. 4D following etching of a portion of second insulating layer 430, where the portion of second insulating layer 430 etched corresponds to, for instance, first pattern line 330a of FIGS. 3D and 3E. As FIG. 4E illustrates, etching of second insulating layer 430 may result in further etching of the exposed part 455 of first insulating layer 420, resulting, at least in part, in the formation of via 460 at the design via location. As first insulating layer 420 and second insulating layer may be similar insulating materials, both first and second insulating layers 420, 430 may be etched by the same etch process. The etch process may be controllably terminated so that first insulating layer 420 remains unetched except at the via location 460.

Figure 4F:
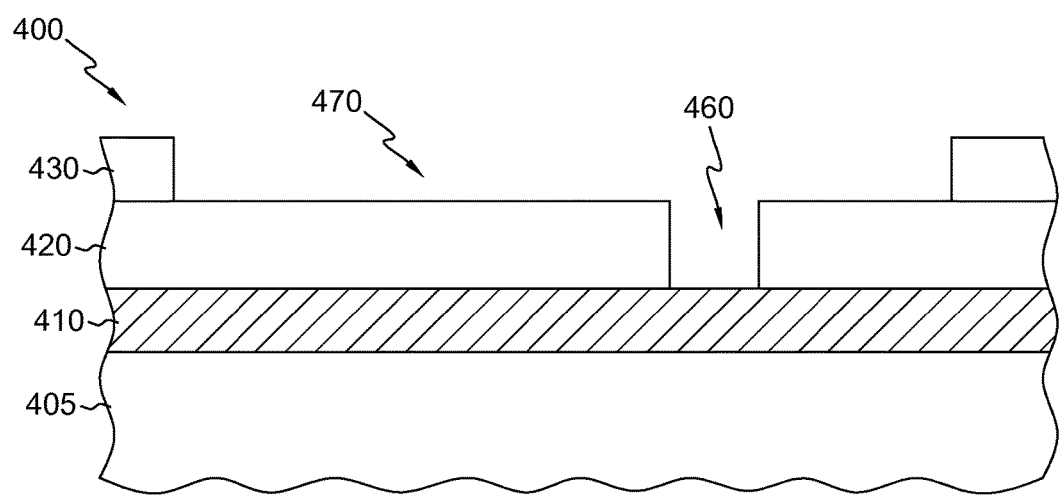
Figure 4G:
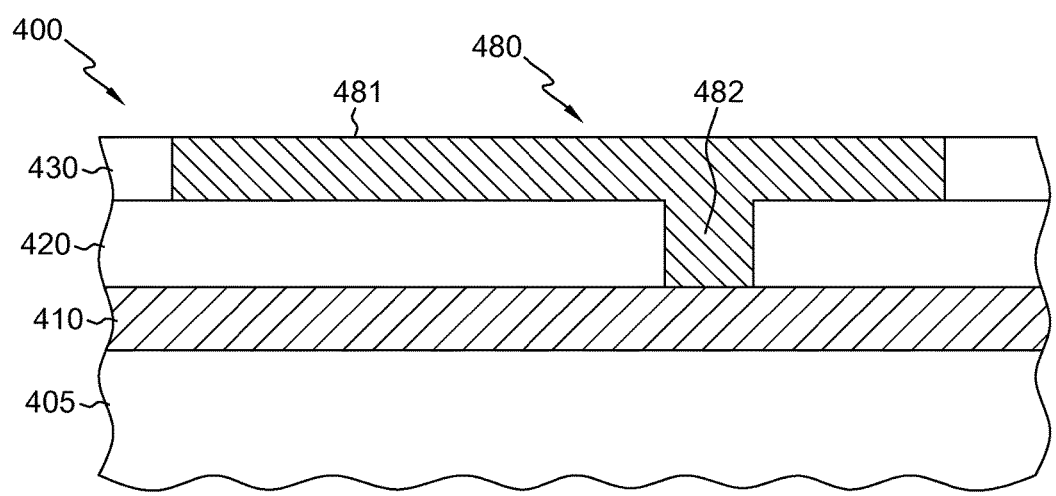

FIG. 4F depicts structure 400 of FIG. 4E following removal of masking material layer 450, exposing the etched portion 470 of second insulating layer 430 and the etched portion 460 of first insulating layer 420. Etched portion 470 of second insulating layer 430 may correspond to a design line, such as design line 330 of FIG. 3A, and etched portion 460 of first insulating layer 420 may correspond to a design via location, such as design via location 335, associated with the design line 330, as depicted in FIG. 3A. As FIG. 4F illustrates, the etching of first pattern line 330a into a first circuit structure layer, such as first insulating layer 420, and etching of second pattern line 330b into a second circuit structure layer, such as second insulating layer 430, may further etch a via at the design via location. FIG. 4G depicts structure 400 of FIG. 4F following provision of a conductive material 480, such as copper or another conductive metal or metal compound, over etched portions 470 and 460. The conductive material 480, as depicted in the example of FIG. 4G, forms both a conductive line 481 and a conductive via 482, where the conductive via 482 is electrically connected to connecting layer 410.

As those with skill in the art will understand, the techniques described above herein applicable to decomposing a circuit pattern layout into a first and second sub-pattern, and subsequent etching of the first and second sub-pattern, may be extended to decomposing the circuit pattern layout into a first sub-pattern, second sub-pattern, and third sub-pattern, with subsequent etching of the first sub-pattern, second sub-pattern, and third sub-pattern. In some embodiments, such as for the exemplary circuit pattern layout 300 of FIG. 3A, it may be possible to decompose the circuit pattern layout into a first sub-pattern and second sub-pattern without the need for a third sub-pattern, depending on part on the proximity of design lines to one another in the original circuit pattern layout, as well as the presence of any wide design lines in the circuit pattern layout. In other embodiments, such as for the circuit pattern layout 100 of FIG. 1A, it may be necessary to decompose the circuit pattern layout into a first sub-pattern, second sub-pattern, and third sub-pattern. This is further illustrated by FIGS. 5A-5D, as described below.

Figure 5A:
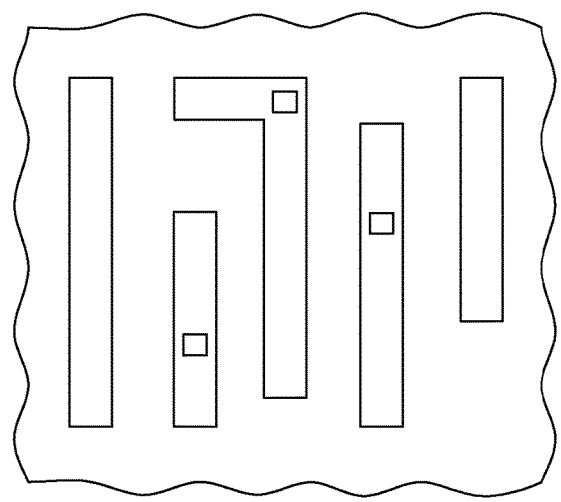
FIGS. 5A-5D depict the circuit design layout of FIG. 1A undergoing a decomposition into a first sub-pattern, second sub-pattern, and third sub-pattern, in accordance with one or more aspects of the present invention; and, FIG. 6 depicts an embodiment of a computer program product, in accordance with one or more aspects of the present invention.

FIG. 5A depicts a circuit pattern layout similar to circuit pattern layout 100 of FIG. 1A. In accordance with the processes described herein, circuit pattern layout of FIG. 5A may be decomposed into a first sub-pattern FIG. 5B, second sub-pattern FIG. 5C, and third sub-pattern FIG. 5D. The decomposition of the circuit pattern may include identifying a first design line of the circuit layout a first design via location associated with the first design line, as well as identifying a second design line of the circuit layout and a second design via location associated with the second design line. The decomposition may further include forming the first pattern line corresponding to the first portion of the first design line and the second pattern line corresponding to the second portion of the first design line, and forming a third pattern line corresponding to a first portion of the second design line and a fourth pattern line corresponding to a second portion of the second design line. The first pattern line, second pattern line, third pattern line, and fourth pattern line may be classified for inclusion in one of the first sub-pattern, the second sub-pattern, or the third sub-pattern.

For example, in some embodiments the first pattern line and third pattern line may be included in the first sub-pattern, and the second pattern line and the fourth pattern line may be included in the second sub-pattern. The etching subsequently at least partially forms a first via at the first design via location and at least partially forms a second via at the second design via location. This process is illustrated, for example, in FIGS. 3A-3F and 4A-4G, above. This may also be illustrated, for example, in FIGS. 5C and 5D. As those with skill in the art will understand, any one sub-pattern formed from the decomposition of a circuit pattern layout, such as the circuit pattern layout of FIG. 5A, may be labeled as a "first sub-pattern" or a "second sub-pattern" or a "third sub-pattern," so that any sub-patterns formed from decomposition of the circuit pattern layout may be interchangeably referred to as a first sub-pattern, second sub-pattern, and so on. Thus, FIG. 5C may be a first sub-pattern formed by decomposition of the circuit pattern layout of FIG. 5A, and FIG. 5D may be a second sub-pattern formed by decomposition of the circuit pattern layout of FIG. 5A. Pattern line 510a may be a first pattern line of the first sub-pattern in FIG. 5C and pattern line 515a may be a third pattern line included in the first sub-pattern of FIG. 5C. Correspondingly, pattern line 510b may be a second pattern line included in the second sub-pattern of FIG. 5D and pattern line 510c may be a fourth pattern line included in the second sub-pattern of FIG. 5D. Etching of the pattern lines 510a-d may be performed, for example, as described above in FIGS. 4A-4G.

In other embodiments, the first pattern line may be included in the first sub-pattern and the second pattern line may be included in the second sub-pattern, and one of the third or fourth pattern line may be included in the third sub-pattern while the other of the third or fourth pattern line is included in either the first sub-pattern or the second sub-pattern. This may be illustrated, for example, in FIGS. 5B, 5C, and 5D. For example, pattern line 505a may be a first pattern line included in the first sub-pattern of FIG. 5B, and pattern line 505b may be a second pattern line included in the second sub-pattern of FIG. 5C. Pattern line 510a may be a third pattern line and pattern line 510b may be a fourth pattern line. As illustrated, third pattern line 510a may be included in the second sub-pattern of FIG. 5C, while fourth pattern line 510b may be included in the third sub-pattern of FIG. 5D. Similarly, pattern line 515a may be a third pattern line and pattern line 515b may be a fourth pattern line, and third pattern line 515a may be included in the second sub-pattern of FIG. 5C, while fourth pattern line 515b may be included in the third sub-pattern of FIG. 5D. First sub-pattern, second sub-pattern, and third sub-pattern may be etched into a respective first circuit structure layer, second circuit structure layer, and third circuit structure layer, as described in part in FIGS. 4A-4G above.

Figure 5B:
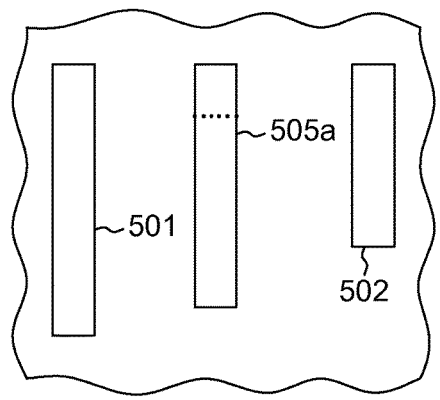
Figure 5C:
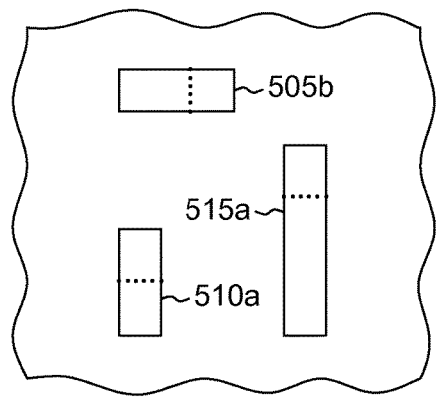
Figure 5D:
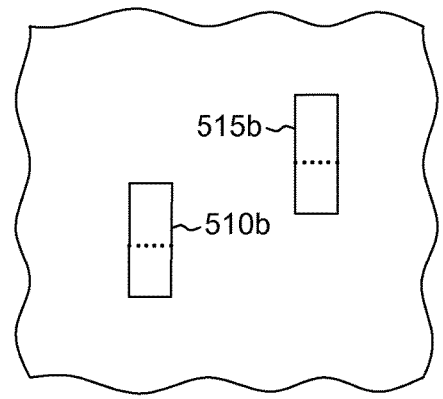

As those with skill in the art will recognize, the example decomposition of FIG. 5A into the sub-patterns of FIGS. 5B, 5C, and 5D is provided by way of example only, and that other possible decompositions of the example circuit pattern layout in FIG. 5A may be possible.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may include a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to include a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 6:
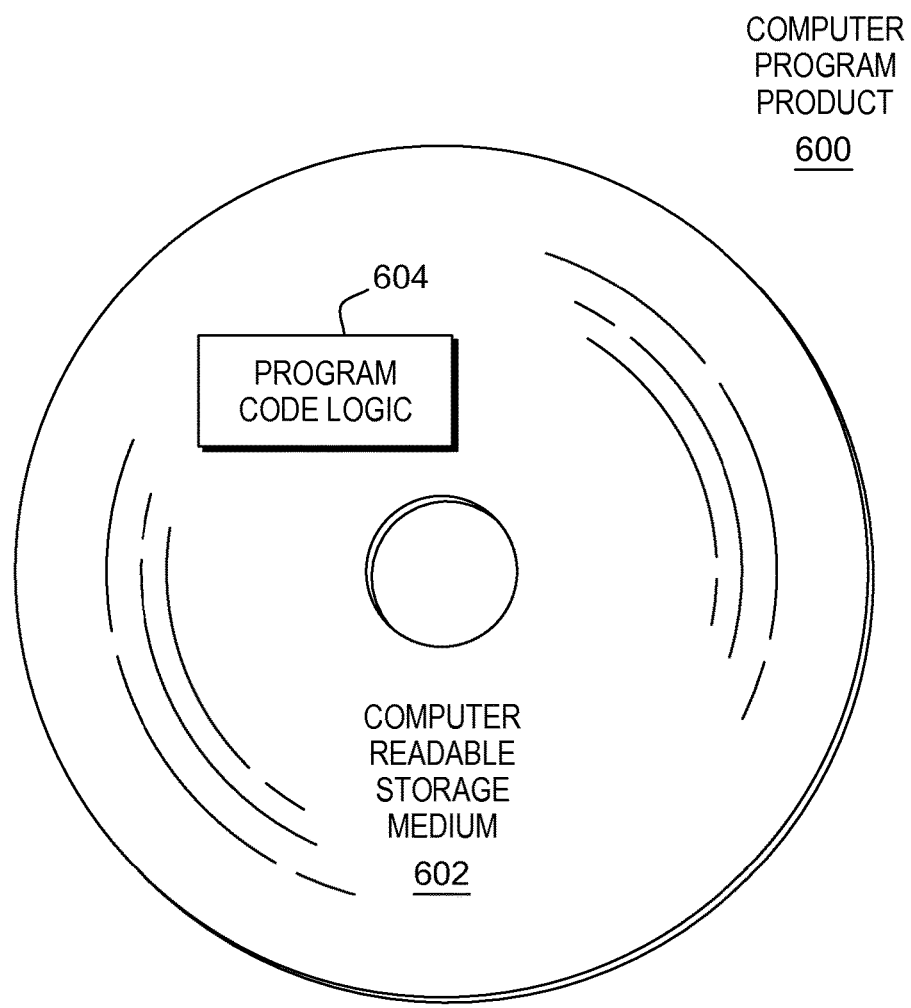

Referring now to FIG. 6, in one example, a computer program product 600 includes, for instance, one or more computer readable media 602 to store computer readable program code means or logic 604 thereon to provide and facilitate one or more aspects of the present invention. Computer readable program code means or logic 604 may include, in one embodiment, instructions for execution by the processor for performing a method, the method including: decomposing a circuit pattern layout for a layer of a circuit structure into at least a first sub-pattern and a second sub-pattern, the decomposing including: identifying, from the circuit pattern layout, at least one design line and at least one design via location associated with the at least one design line; and, forming a first pattern line for the first sub-pattern, the first pattern line corresponding to a first portion of the at least one design line, and a second pattern line for the second sub-pattern, the second pattern line corresponding to a second portion of the at least one design line, wherein the first pattern line and the second pattern line overlap at least at the at least one design via location in an overlay of the first sub-pattern with the second sub-pattern.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram, such as in FIG. 2, may represent a module, segment, or portion of code, which includes one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method comprising:
    decomposing a circuit pattern layout for a layer of a circuit structure into at least a first sub-pattern and a second sub-pattern, the decomposing comprising:
        identifying, from the circuit pattern layout, at least one design line and at least one design via location associated with the at least one design line;
        forming a first pattern line for the first sub-pattern, the first pattern line corresponding to a first portion of the at least one design line, and a second pattern line for the second sub-pattern, the second pattern line corresponding to a second portion of the at least one design line, wherein the first pattern line and the second pattern line overlap at least at the at least one design via location in an overlay of the first sub-pattern with the second sub-pattern; and,
    etching the first sub-pattern in a first circuit structure layer and the second sub-pattern in a second circuit structure layer, the etching at least partially forming a via at the at least one design via location.

2. The method of claim 1, wherein the method further comprises measuring a width of the at least one design line, and using the width to classify the at least one design line as either a narrow design line or a wide design line.

3. The method of claim 2, wherein the at least one design line is classified as a narrow design line, and wherein the forming comprises:
    dividing, at the at least one design via location, the at least one design line into the first pattern line of the first sub-pattern and the second pattern line of the second sub-pattern; and,
    extending a portion of at least the first pattern line so that the first pattern line and the second pattern line overlap at the at least one design via location in the overlay of the first sub-pattern with the second sub-pattern.

4. The method of claim 3, wherein the forming further comprises extending a portion of the second pattern line so that the first pattern line and the second pattern line overlap at the at least one design via location in the overlay of the first sub-pattern with the second sub-pattern.

5. The method of claim 4, wherein the circuit structure further comprises a connecting layer disposed below the layer, the connecting layer comprising at least one connecting line associated with the at least one design via location, and wherein extending one or both of the portion of the first pattern line and/or the portion of the second pattern line further comprises extending one or both of the portion of the first pattern line and/or the portion of the second pattern line along a length corresponding to the at least one connecting line to thereby increase the overlap of the first pattern line and the second pattern line.

6. The method of claim 2, wherein the at least one design line is classified as a wide design line, and wherein the forming comprises:
    forming the first pattern line for the first sub-pattern, the first pattern line being disposed to overlap the at least one design via location; and,
    forming the second pattern line for the second sub-pattern, the second pattern line matching the at least one design line and overlapping the first pattern line at least at the at least one design via location.

7. The method of claim 6, wherein the circuit structure further comprises a connecting layer disposed below the layer, the connecting layer comprising at least one connecting line associated with the at least one design via location, and wherein forming the first pattern line for the first sub-pattern comprises extending the length of the first pattern line along a length corresponding to the at least one connecting line to increase the overlap of the first pattern line and the second pattern line.

8. The method of claim 1, wherein the decomposing further comprises decomposing the circuit pattern layout into the first sub-pattern and the second sub-pattern and a third sub-pattern, wherein the at least one design line is a first design line of the circuit layout and the at least one design via location is a first design via location associated with the first design line, and the method further comprises:
    identifying, from the circuit pattern layout, a second design line of the circuit layout and a second design via location associated with the second design line;
    forming the first pattern line corresponding to the first portion of the first design line and the second pattern line corresponding to the second portion of the first design line;
    forming a third pattern line corresponding to a first portion of the second design line and a fourth pattern line corresponding to a second portion of the second design line;
    classifying the first pattern line, second pattern line, third pattern line, and fourth pattern line for inclusion in one of the first sub-pattern, the second sub-pattern, or the third sub-pattern.

9. The method of claim 8, wherein the first pattern line and third pattern line are included in the first sub-pattern, and the second pattern line and the fourth pattern line are included in the second sub-pattern.

10. The method of claim 9, wherein the etching at least partially forms a first via at the first design via location and at least partially forms a second via at the second design via location.

11. The method of claim 8, wherein the first pattern line is included in the first sub-pattern and the second pattern line is included in the second sub-pattern, wherein one of the third or fourth pattern line is included in the third sub-pattern, and the other of the third or fourth pattern line is included in either the first sub-pattern or the second sub-pattern.

12. The method of claim 11, wherein the etching further comprises etching the third sub-pattern in a third circuit structure layer, and wherein the etching at least partially forms a first via at the first design via location and at least partially forms a second via at the second design via location.

* * * * *